United States Patent
Wonak et al.

(10) Patent No.: US 7,024,189 B2
(45) Date of Patent: *Apr. 4, 2006

(54) APPARATUS FOR WIRELESSLY-COUPLING A BLUETOOTH-WIRELESS CELLULAR MOBILE HANDSET TO A DOCKING STATION FOR CONNECTING A STANDARD TELEPHONE SET TO THE CELLULAR NETWORK

(75) Inventors: Daniel C. Wonak, Mundelein, IL (US); Jeffrey M. Hickey, Patchogue, NY (US)

(73) Assignee: Telular, Corp., Vernon Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/823,881

(22) Filed: Apr. 15, 2004

(65) Prior Publication Data

US 2005/0003813 A1 Jan. 6, 2005

Related U.S. Application Data

(63) Continuation of application No. 10/459,374, filed on Jun. 11, 2003, now Pat. No. 6,778,824.

(51) Int. Cl.
*H04Q 7/20* (2006.01)

(52) U.S. Cl. ............... 455/426.2; 455/414.1; 455/550.1; 455/552.1; 455/553.1; 455/554.2; 455/556.1; 455/557

(58) Field of Classification Search ............ 455/426.2, 455/414.1, 553.1, 554.2, 556.1, 557, 552.1, 455/550.1

See application file for complete search history.

(56) References Cited

U.S. PATENT DOCUMENTS 6,778,824 B1 * 8/2004 Wonak et al. ........... 455/426.2

\* cited by examiner

*Primary Examiner*—Stephen M. D'Agosta
(74) *Attorney, Agent, or Firm*—Milton S. Gerstein; Much, Shelist, Freed

(57) ABSTRACT

A Bluetooth-wireless docking station for use with a Bluetooth-enabled cellular mobile handset, which docking station allows mobility to the cellular mobile handset rather than having to be fixed stationarily in the docking station, which docking station couples standard POTS telephone sets, or POTS-like telephone units, connected to in-premises wiring, to the cellular, or cellular like, network. The cellular mobile handset may be used to make or receive calls remote from the docking station, while the docking station communicates with the Bluetooth-enabled cellular mobile handset via a Bluetooth-wireless transceiver using Bluetooth-wireless air-interface protocol. A subscriber-line interface circuit, controlled by a microprocessor, couples the standard POTS telephone sets to the cellular mobile handset's transceiver whereby the phones may make or receive calls via the cellular, or cellular like, network, which subscriber line interface also provides loop current, ring signaling, dial tone, loop current detect, flash detection, DTMF conversion, and other central office functions to the telephone sets. As long as the cellular mobile handset is within range of the Bluetooth-wireless transceiver of the docking station, the telephones are connected to the cellular network, as long as the cellular mobile handset is not engaged in a call of its own. The same docking station is capable of accommodating and being paired with any of a wireless-enabled TDMA-based, GSM-based, CDMA-based, or AMPS-based standard transceiver.

18 Claims, 5 Drawing Sheets

APPARATUS FOR WIRELESSLY-COUPLING A BLUETOOTH-WIRELESS CELLULAR MOBILE HANDSET TO A DOCKING STATION FOR CONNECTING A STANDARD TELEPHONE SET TO THE CELLULAR NETWORK

CROSS REFERENCE TO RELATED APPLICATION

This is a continuation application Ser. No. 10/459,374, filed on Jun. 11, 2003 U.S. Pat. No. 6,778,824.

BACKGROUND OF THE INVENTION

The present invention is directed to a docking station for a cellular mobile handset that serves the dual function of recharging the cellular mobile handset and which also couples a standard POTS telephone set, or POTS-like telephone unit such as a facsimile machine, to the transceiver of the cellular mobile handset. Such a docking station has been manufactured and sold by Telular Corp. of Vernon Hills, Ill. under the name "CELDOCK". This docking station requires that the cellular mobile handset be physically located and docked in the docking station in order to allow for the coupling of the standard telephone instrument to the transceiver of the cellular mobile handset. This docking station allows for the connection of the cellular mobile handset to the RJ-11 in-premises-wiring of a home or office via an interface, which interface includes a cellular-interface device, such as that disclosed in commonly-owned U.S. Pat. No. 4,658,096, West, et al., whereby one or more POTS or POTS-type telephone sets may be connected to a cellular network for making and receiving calls over the cellular network. The cellular-connection may be accomplished using TDMA, GSM, CDMA, or AMPS technology, and the equivalents thereof The interface provides the necessary central-office functions, such as dial tone, ring voltage, and the like, to the connected POTS instruments.

However, a considerable problem with this prior-art, fixed docking station is that a number of different versions have been required in order to meet the different configurations of the mobile handsets. Thus, a separate version has been required for each of TDMA, GSM, CDMA, or AMPS technologies, rather than one, universal adapter that may be used in all cellular-technology versions. Moreover, since the cellular mobile handset must be stationarily mounted in the docking station, the cellular mobile handset is prevented from being operated in a mobile environment, but must remain fixed in place in the docking station, if the telephone instruments are to remain connected to the cellular network.

Bluetooth-wireless technology, which has allowed remote, wireless connectivity between hardware devices, such as computers and printers, is now also used in cellular mobile handsets for allowing remote, wireless connection between a laptop or desktop computer and the cellular mobile handset for connecting the laptop or desktop computer to the Internet via the cellular or cellular-like network. Examples of Bluetooth-enabled cellular mobile handsets are the Nokia models 6310, 7650, 8910, and Ericsson models R320, R520, T28, T39, and T68, which utilize 3-Com Corp.'s Bluetooth-wireless technology. Bluetooth-wireless specification includes both a link layer and application layer that support data and voice. Cellular radios that utilize Bluetooth wireless specification operate in the 2.4 GHz. radio spectrum using a spread spectrum, frequency hopping, full-duplex signaling at up to 1600 hops./sec. The signal hops among 79 frequencies at 1 MHz. intervals to give a high degree of interference immunity.

SUMMARY OF THE INVENTION

It is the primary objective of the present invention to provide a cellular-mobile-handset docking station utilizing Bluetooth-wireless technology for coupling a cellular mobile handset having a Bluetooth-wireless transceiver to a cellular-mobile-handset docking station that couples a standard POTS telephone set to the Bluetooth-enabled transceiver of the cellular mobile handset, whereby the cellular mobile handset need not be physically and stationarily positioned in the docking station, but may be allowed mobility with regard to the docking station, so that the cellular mobile handset may be used independently of, and remotely from, the actual docking station, while still allowing the cellular interface device of the docking station to connect the standard POTS telephone set, or POTS-like telephone unit, to the cellular, or cellular-like, network.

It is, also, the primary objective of the present invention to provide such a cellular-mobile-handset docking station utilizing Bluetooth-wireless connectivity for coupling a cellular mobile handset having a Bluetooth-enabled transceiver to a cellular-mobile-handset docking station that couples a plurality of standard POTS telephone sets, or POTS-like telephone units, including cordless telephones, to the Bluetooth-enabled transceiver of the cellular mobile handset via RJ-11 in-premises wiring, whereby each of the standard POTS telephone sets, or POTS-like telephone units may be coupled to the cellular, or cellular-like, network.

It is, also, the primary objective of the present invention to provide such a cellular-mobile-handset docking station utilizing Bluetooth-wireless connectivity for coupling a cellular mobile handset that is able to accommodate any Bluetooth-enabled cellular mobile handset, whether it be based on TDMA, GSM, CDMA, or AMPS specifications, without requiring a separate and different version thereof.

It is, also, the primary objective of the present invention to provide such a cellular-mobile-handset docking station utilizing Bluetooth-wireless connectivity for coupling a cellular mobile handset that is able to accommodate any Bluetooth-enabled cellular mobile handset, whether it be based on TDMA, GSM, CDMA, or AMPS specifications, which Bluetooth-wireless docking station of the invention accommodates and works with multiple and different cellular mobile handsets in the same home, allowing the user to choose that cellular mobile handset that offers the most advantageous rate plan at any given time or period.

The Bluetooth-wireless docking station of the present invention for use with a Bluetooth-enabled cellular mobile handset allows mobility to the cellular mobile handset rather than requiring it to be fixed stationarily in the docking station as the prior-art docking station, whereby the cellular mobile handset may be used to make or receive calls remote from the docking station, while still allowing coupling of the standard POTS telephone sets, or POTS-like telephone units, on the in-premises wiring to the cellular, or cellular like, network. The microprocessor-controlled docking station communicates with the Bluetooth-enabled cellular mobile handset via a Bluetooth-wireless transceiver using Bluetooth-wireless air-interface protocol, with the POTS telephone sets being connected to the Bluetooth-wireless transceiver by a CODEC and a subscriber-line interface circuit coupled to the standard POTS telephone sets, whereby the phones may make or receive calls via the cellular, or cellular like, network. The subscriber line interface provides loop current, ring signaling, dial tone, loop current detect, flash detection, DTMF conversion, and other central office functions to the telephone sets. As long as the cellular mobile handset is within range of the Bluetooth-wireless transceiver of the docking station, the telephones are connected to the cellular network, as long as the cellular mobile handset is not engaged in a call of its own.

BRIEF DESCRIPTION OF THE DRAWING

The invention will be more readily understood with reference to the accompanying drawing, wherein.

DETAILED DESCRIPTION OF THE INVENTION

Figure 1:
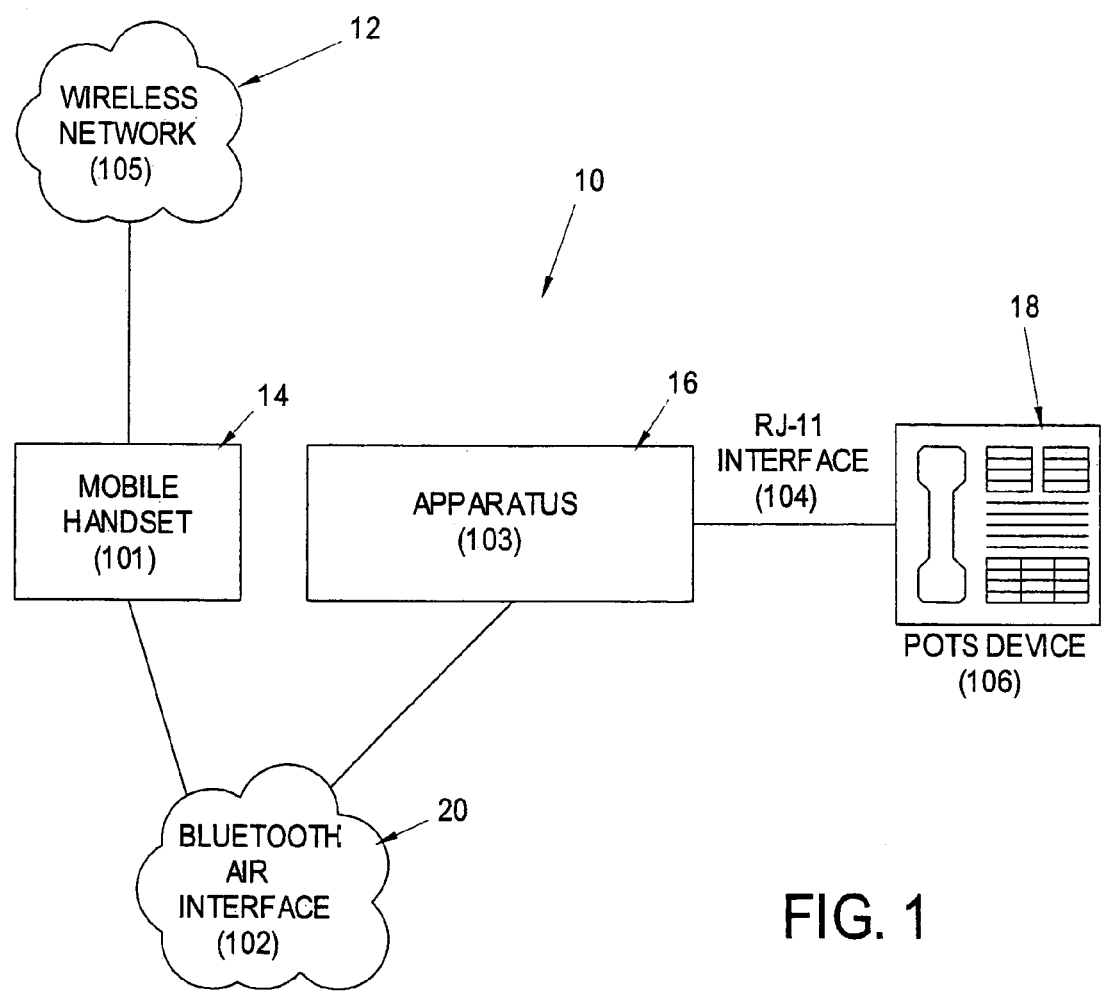
FIG. 1 is a block diagram showing the system of the invention for providing a Bluetooth-enabled cellular mobile handset connectivity to a docking station for coupling a standard POTS telephone set, or POTS-like telephone unit, to a cellular, or cellular like, network, via the Bluetooth-enabled transceiver of the cellular mobile handset.

Referring now to the drawings in greater detail, in FIG. 1 there is shown the overall system 10 in which the Bluetooth-wireless docking station of the invention is environed. The overall system includes a wireless network 12, such as the switched cellular network, a Bluetooth-enabled cellular mobile handset 14 having a Bluetooth-wireless-enabled transceiver utilizing Bluetooth-wireless-connectivity specification, Bluetooth-wireless docking station 16 of the invention with which the Bluetooth-enabled cellular mobile handset 14 is operationally associated, and a standard POTS telephone set or POTS-like telephone unit 18 which plugs into the Bluetooth-wireless docking station 16 of the invention via an RJ-11 jack-interface thereof. While one such standard POTS telephone set, or POTS-like telephone unit has been disclosed for purposes of clarity, a plurality of such standard POTS telephone sets, or POTS-like telephone units 18 may be plugged into the Bluetooth-wireless docking station 16 either directly, or by connecting the Bluetooth-wireless docking station 16 to the in-premises wiring of a house or office, as in the above-discussed prior-art "CEL-DOCK" device manufactured by Telular Corp. of Vernon Hills, Ill. The Bluetooth-enabled cellular mobile handset 14 communicates with the Bluetooth-wireless docking station 16 via conventional Bluetooth-wireless air interface protocol 20.

Figure 2:
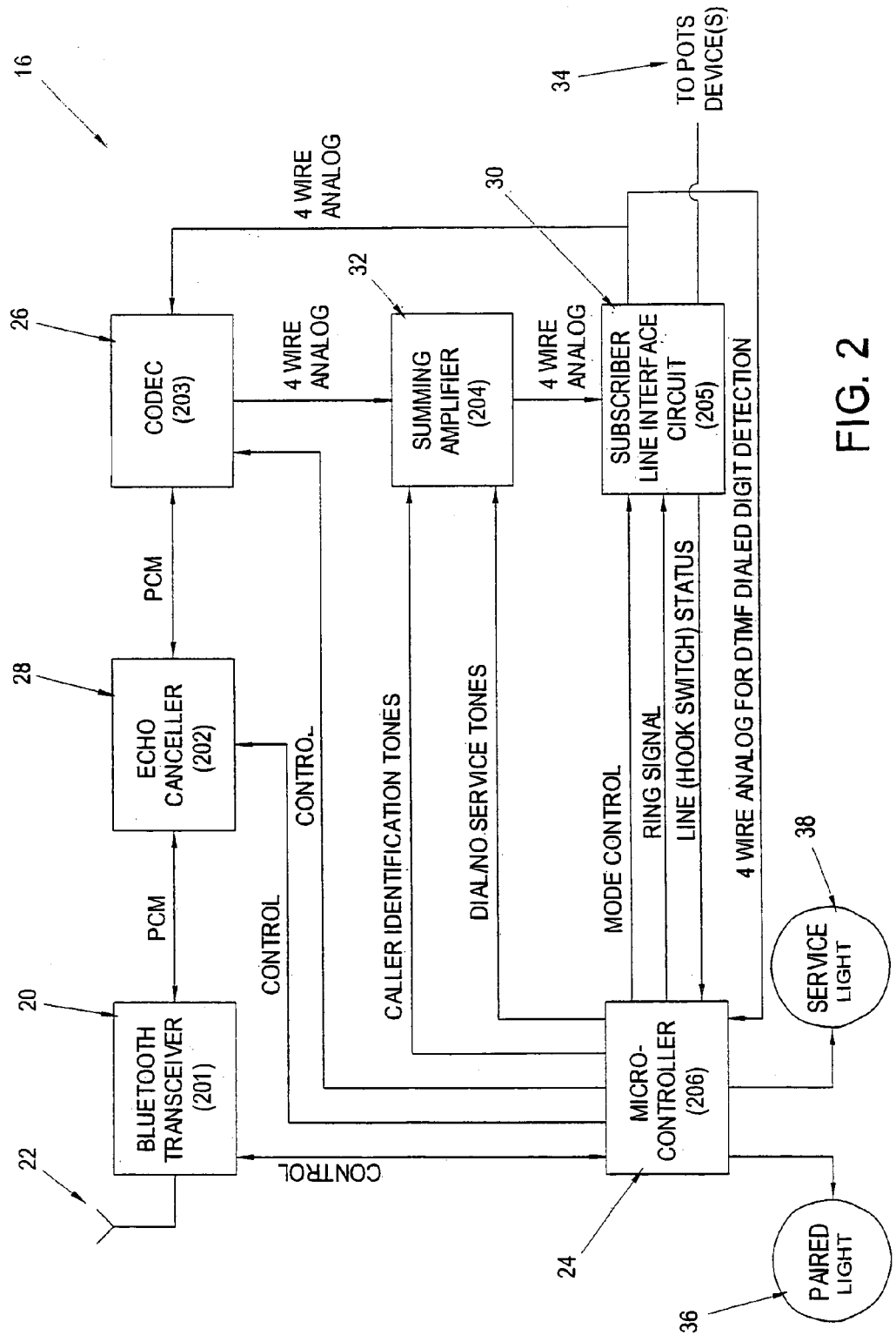
FIG. 2 is a schematic of the hardware of the Bluetooth-wireless docking station of FIG. 1.

Referring to FIG. 2, there is shown, in detail, the Bluetooth-wireless docking station 16 of the invention for communicating with the Bluetooth-enabled cellular mobile handset 14 via Bluetooth-wireless air-interface protocol, and for coupling one or more standard POTS telephone sets, or POTS-like telephone units, to the Bluetooth-enabled transceiver of the cellular mobile handset 14 for allowing the standard POTS telephone set, or POTS-like telephone unit, to make outgoing, and to receive incoming, calls via the switched cellular network 12, or equivalents thereof. A Bluetooth-wireless transceiver 20 provides a transmitter and receiver that meets the Bluetooth-wireless specification for power, frequency, and air protocol, and handles all of the functions necessary to implement Bluetooth-wireless connectivity between the Bluetooth-wireless docking station 16 and the Bluetooth-enabled cellular mobile handset 14. The Bluetooth-wireless transceiver 20 may be, for example, an UltimateBlue 3000 Radio Processor manufactured by Silicon Wave, Inc., and is attached to an antenna 22 optimized for Bluetooth-wireless-technology operation, and contains conventional a Bluetooth-wireless-protocol stack, which implements the requirements of Bluetooth-wireless specifications. The input/output of the Bluetooth-wireless docking station 16 is an audio signal containing the voice information. The Bluetooth-wireless transceiver's operations are controlled by software in an embedded microprocessor, which executes the Bluetooth-wireless protocol-stack software, and provides a high-level interface that controls the Bluetooth-wireless transceiver operational modes. Audio input and output are provided by using a pulse-coded modulation (PCM) format. CODEC 26 converts the PCM audio data-stream to and from the Bluetooth-wireless transceiver 20 into a four-wire analogue interface. The CODEC may be model number MC145481 manufactured by Motorola, Inc. which is a 3V PCM Codec-filter for voice digitation and reconstruction . An echo canceller 28 removes the echo caused by a POTS telephone speaker/microphone interaction. The echo canceller is a low-voltage acoustic canceller, such as CMOS model MT93L16 manufactured by Zarlink Semiconductor, Inc. The four-wire analogue interface is connected to a subscriber-line interface circuit device 30 via a summing amplifier 32, which is used to mix the four-wire analogue audio signals, the dial/no service tones and the caller ID tones as received from the transceiver 20, for input into a subscriber-line interface circuit device 30. The summing amplifier is preferably a single-supply quad operational amplifier, model MC3403 or MC3303, provided by Semiconductor Components Industries, Inc. The subscriber-line interface circuit device 30 is preferably an STMicroelectronics model STLC3055 which is specifically designed for use in a Wireless Local Loop (WLL) environment. The circuitry provides loop current, ring signaling, dial tone, loop current detect, flash detection, and other central office functions to a telephone set or sets 34, and is controlled by a microcontroller 24, such as an "INTEL MCS" 51/251 family of microcontrollers or "INTEL MCS" 96 microcontroller. The microcontroller 24 sends mode-control command signals to the subscriber line interface 30 to cause it generate appropriate, corresponding tones indicative of events, as described hereinbelow when discussing the flow charts of FIGS. 3–5. The microcontroller 24 also controls the transceiver 20, echo canceller 28, and CODEC 26. The subscriber-line interface circuit device 30 provides a ring tone of proper cadence and frequency in response to a "Ring Signal" input from the microcontroller 24, and an on-hookloff-hook output signal to the microcontroller 24. A four-wire, analogue DTMIF digit detector sends an input signal to the microcontroller 24 when digits are dialed on a telephone set 34, which DTMIF signals are sent to the CODEC 26 for conversion into a digital data stream for transmission by the transceiver 20.

Use of the Bluetooth-wireless transceiver 20 allows the Bluetooth-enabled cellular mobile handset 14 to be mobile relative to the docking station 16, where it may, therefore, be used to make or receive a cellular call as much as thirty or more feet away from the docking station, while at the same time still allowing the coupling of the standard POTS telephone set or sets, or POTS-like telephone unit or units, to the cellular, or cellular like, network via the apparatus 16. The mobile handset 14 operates normally within the cellular network. When the Bluetooth-enabled transceiver within the mobile handset 14 comes within the range of the Bluetooth-wireless transceiver 20, the two Bluetooth-wireless devices initiate wireless communications in conventional manner, which is known as pairing. An indicator LED 36 is illuminated when the mobile handset is paired with the apparatus. Another indicator LED 38 is illuminated when the paired transceivers have service from the cellular network. Once paired, the apparatus 16 provides a bridge between the mobile handset and the standard POTS telephone set or sets, or POTS-like telephone unit or units, or to the in-premises RJ-11 wiring to which are connected the standard POTS telephone sets, or POTS-like telephone units. When the mobile handset 14 receives an incoming call from the cellular network, it sends its conventional command signals to the Bluetooth-wireless transceiver 20 of the apparatus 16 using the Bluetooth-wireless air interface. The apparatus 16 translates these commands into ring and caller identification signals via the subscriber line interface 30 for transmission directly to the standard POTS telephone set or sets, or POTS-like telephone unit or units connected directly to the docking station via one or more RJ-11 jacks, or onto the RJ-11 wiring to the standard POTS telephone sets, or POTS-like telephone units, connected to the in-premises wiring. The POTS devices are then able to answer the call. An "answer" command is returned to the mobile device via the apparatus 16. The indicator LED 36 shows when a call is active between the paired mobile handset and the apparatus. At this point, call-voice operation is achieved by using Bluetooth-wireless-connectivity voice transmission between the POTS device or devices via the apparatus 16 and to the mobile handset. Either the calling or called party may terminate the call in the conventional manner.

The subscriber line interface 30 provides the talk battery voltage and dial tone to the attached POTS device or devices. A POTS device, when off-hook, receives a dial tone and may dial digits for making an outgoing call. All of the standard signals from the POTS device are translated by the apparatus 16 into Bluetooth-wireless-protocol commands, which are then sent to the Bluetooth-enabled mobile handset 14. The mobile handset's transceiver establishes the dialed connection with the cellular network and voice transmission in the conventional manner.

The microcontroller of the Bluetooth-wireless transceiver 20 of the docking station 16 is provided with a software switch whereby temporary unpairing of the two transceivers may be effected, so that when the cellular mobile handset 14 is engaged in a call over the cellular, or cellular like, network, the standard POTS telephone sets, or POTS-like telephone units, 34 cannot interfere therewith. Upon disengagement of the call of the cellular mobile handset with the cellular, or cellular like, network, normal pairing between the transceivers is reinstituted. Thus, the mobile handset is always fully operational in the cellular network, even when wirelessly connected to the docking station 16. When the handset moves out of the range of the docking station, such as, for example, thirty feet, it no longer has any effect on the in-premises wiring or on the standard POTS telephone sets, or POTS-like telephone units coupled to the docking station 16, thus effectively disconnecting the telephone set or sets from the cellular, or cellular like, network.

Figure 3:
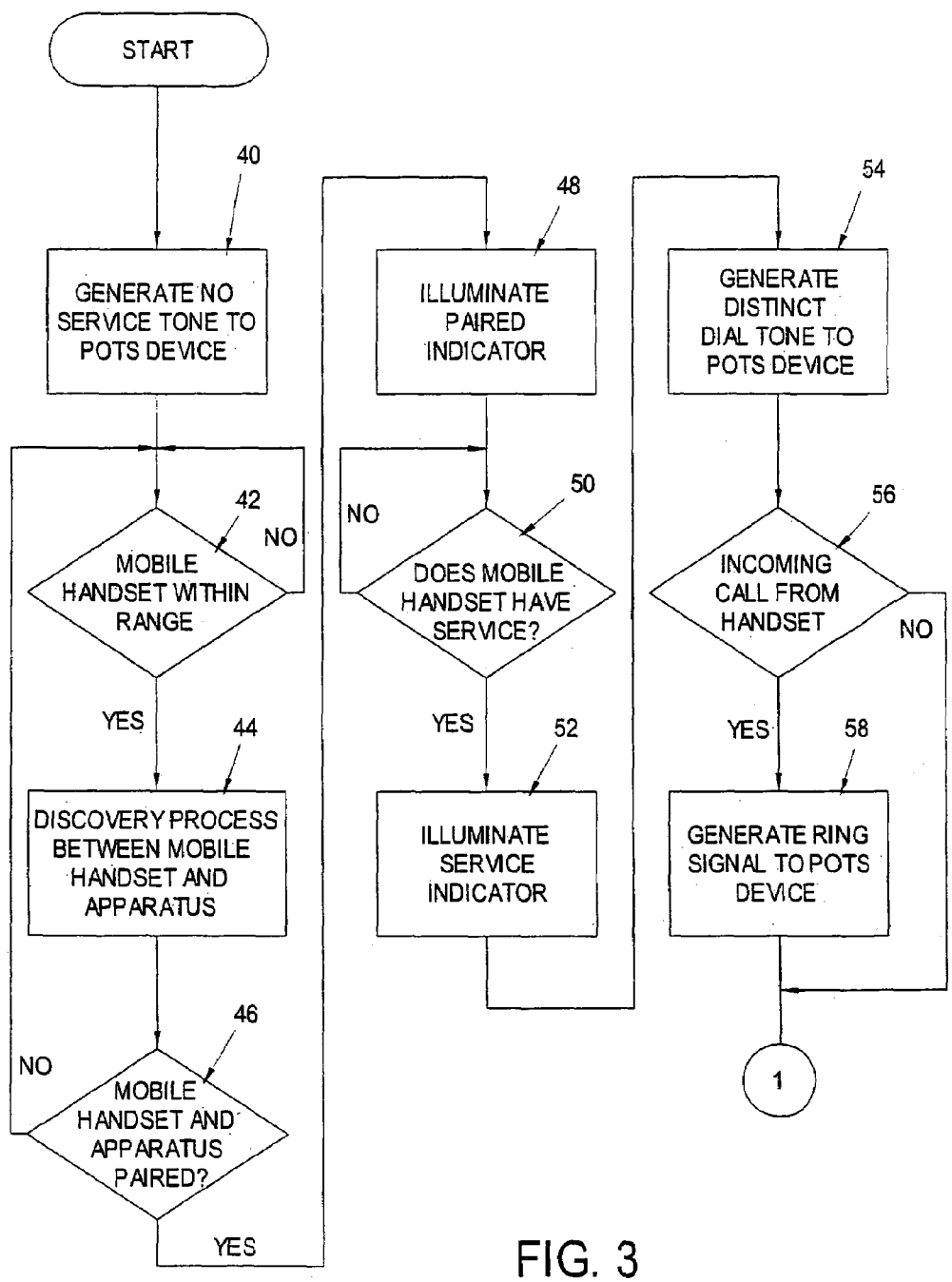
FIGS. 3–5 are flow charts showing the logical operation of the software for the Bluetooth-wireless docking station of the invention.
Figure 4:
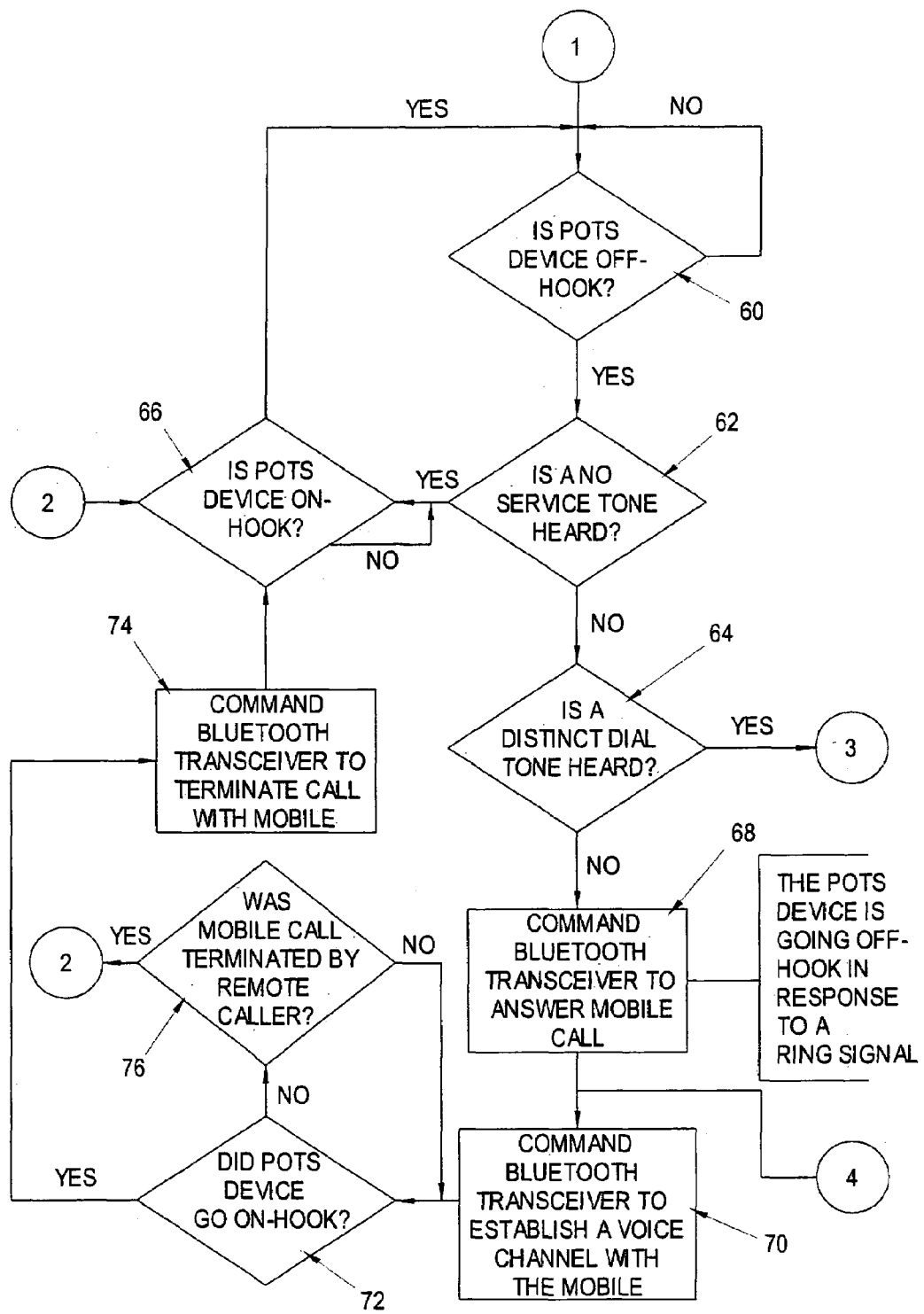
Figure 5:
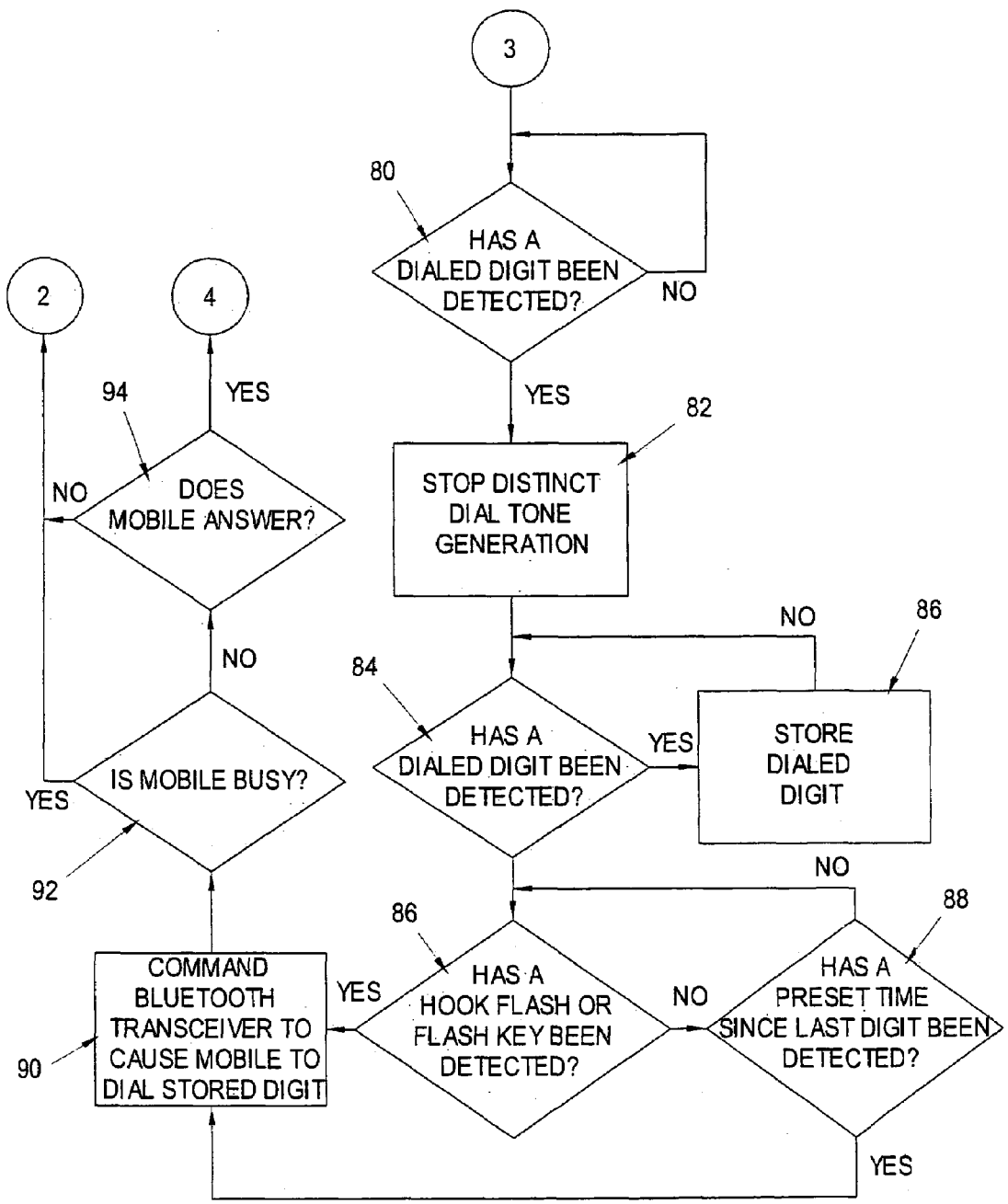

Referring now to the FIGS. 3–5, the flow charts for the software stored in the memory of microprocessor 24 for controlling the Bluetooth-wireless transceiver 20, the echo canceller 28, CODEC 26, summing amplifier 32, and subscriber line interface 30, are shown. In the unpaired state between the Bluetooth-enabled transceiver of the cellular mobile handset 14 and the Bluetooth-wireless transceiver 20 of the docking station 16, the software generates a "No-Service Tone" to the subscriber line interface 30 (block 40) via summing amplifier 32, which tone is a unique and distinctive one to indicate lack of coupling to the cellular, or cellular like, network. Decision block 42 determines when pairing of the two transceivers has occurred. If it has not, then the "No-Service Tone" is continued to be generated. When the Bluetooth-enabled transceiver of the cellular mobile handset 14 comes within range of the Bluetooth-wireless transceiver 20 of the docking station ("YES" to decision block 42), then a conventional Bluetooth-wireless-protocol discovery process ensues between the two Bluetooth-wireless devices 14 and 20 to pair them (block 44). The software then determines if the pairing process has been successful (block 46). If "NO", indicating a fault or that the discovery process was terminated owing to the cellular mobile handset 14 falling out of range with the Bluetooth-wireless transceiver 20, the program returns to decision block 42 to await the cellular mobile handset's coming within range. If the discovery process has been successful ("YES" to decision block 46), then the indicator LED 36 is caused to be illuminated indicating pairing (block 48). The program then seeks to determine the status of the connection of the cellular mobile handset 14 to the cellular, or cellular like, network (block 50). If no cellular service is present ("NO" to decision block 50), then the program remains idle until such cellular service is detected. When cellular service is detected ("YES" to decision block 50), then LED 38 is caused to be illuminated (block 52). Upon such cellular-network connection, the software causes the microprocessor to send a command-signal to the subscriber line interface 30 via summing amplifier 32, to generate a distinct dial tone to the standard POTS telephone sets, or POTS-like telephone units when off-hook (block 54). Decision block 56 then determines if an incoming call from the cellular network via cellular mobile handset 14 is present. If "YES", then the software will send a signal to the subscriber line interface to have it generate a ring-voltage for the telephone set or sets (block 58). If the answer to decision block 56 is "NO", or after the subscriber line interface has generated the ring-voltage, the software determines in decision block 60 if telephone set has gone off-hook. If "NO", then the program loops back to await an off-hook state. If "YES", then decision block 62 determines if a distinctive "No Service" tone has been generated, which "No Service" tone is generated if the cellular mobile handset has gone out of range, or if the cellular mobile handset is itself engaged in a call with the cellular network, and which would be generated if the answer to decision block 56 was a "NO", indicating that the reason why the telephone set went off-hook was not in response to an incoming call but to make an outgoing call. If "YES" to decision block 62, then decision block 66 decides if the telephone set has gone on-hook in response to the "No-Service" tone, and if it is "YES" to decision block 66, indicating on-hook, the program returns to the stand-by decision block 60 to await off-hook. If the answer to decision block 62 is "NO", then the software decides, in decision block 64, if the distinct dial tone has been generated. If "YES", which is relevant to when the answer to decision block 56 was "NO", then the program proceeds to the outgoing-call subroutine discussed hereinbelow with reference to FIG. 5. If the answer to decision block 64 is "NO", indicative of an incoming call (when the answer to decision block 56 was "YES"), then the off-hook condition of the telephone set causes the subscriber line interface 30 to generate a command signal to the microprocessor 24 indicative of off-hook status, in order to have the microprocessor send out signaling for the Bluetooth-wireless transceiver 20 to tell the Bluetooth-enabled transceiver of the cellular mobile handset to answer the incoming call (block 68), whereupon a voice channel for audio transmission is established between the Bluetooth-wireless transceiver 20 and the Bluetooth-enabled cellular mobile handset (block 70). The program then decides the on-hook status of the telephone set in order to determine when the call has been terminated (decision block 72). If the telephone set has gone on-hook ("YES" to decision block 72), indicating call-termination, then a command-signal is generated to command the Bluetooth-wireless transceiver 20 to terminate the call with the cellular mobile handset (block 74), and the program returns to decision block 60 to await the next off-hook status. If the answer to decision block 72 is "NO", indicating call-in-progress status, then it is determined if it was terminated by the remote caller (decision block 76). If "NO", then the program loops back to decision block 72 to await on-hook status and call-termination. If the answer to decision block 76 is "YES", then the program loops back to decision block 66, to await on-hook status of the telephone set, upon which the program returns stand-by off-hook determination of decision block 60.

Referring now to FIG. 5, as discussed above, when the answer to decision block 64 is "YES", indicative of an off-hook status in order to make an outgoing call, the outgoing-call subroutine of FIG. 5 is carried out. In decision block 80, the software awaits for the first dialed digit. If it is detected ("YES" to decision block 80), then the software generates a signal to the subscriber line interface 30 to stop dial-tone generation (block 82). Then, decision block 84 determines when each dialed digit of the call to be made has been dialed, and stores each dialed digit in memory (block 86). Decision block 84 waits until no more digits have been dialed ("NO" to decision block 84). This decision as to the end of dialing may be accomplished by a hook flash key, or other input into the telephone set ("YES" to decision block 86), or may be accomplished by a simple time-out method ("YES" to decision block 88). Upon detection of the last digit dialed, the Bluetooth-wireless transceiver 20 then sends the dialed digits to the Bluetooth-enabled cellular mobile handset for storage therein. The program then determines if the cellular mobile handset is busy, which is indicative of the cellular mobile handset being already engaged in a call over the cellular network (decision block 92). If the cellular mobile handset is busy, then the program returns to decision block 66 of FIG. 4, in order to await on-hook status of the telephone set, along with the generation of a "No-Service" tone to the telephone set if it is still off-hook (decision block 62), as described hereinabove. If the answer to decision block 92 is "NO", meaning the cellular mobile handset is not engaged in a call, then the program determines if the cellular mobile handset responds to the query by the Bluetooth-wireless transceiver 20 for storing the dialed digits (decision block 94). If the cellular mobile handset does not respond ("NO" to decision block 94), then the program returns to decision block 66 of FIG. 4, in the same manner as described above with regards to a busy signal being detected from the cellular mobile handset in decision block 92. If the cellular mobile handset does respond and does store the dialed digits, then the program proceeds to establish a voice channel between the Bluetooth-wireless transceiver 20 and the Bluetooth-enabled transceiver of the cellular mobile handset by looping to block 70 of FIG. 4, whereupon call-connection and call-termination proceed in the same manner as described above with reference to blocks 70–76.

In use, when making an outgoing wireless call from one of the telephone sets, one first lifts the house phone handset to go off-hook, and hears distinct dial tone indicating that the apparatus is prepared to make an outgoing wireless call. One then enters the telephone number he wishes to call, with the dial tone being turned off after the first digit key is dialed. After all of the digits of the telephone number are entered, one then presses the "#" key, or, alternatively, just waits for the connection via a three-second timeout. When receiving an incoming wireless call on the telephone set, the telephone set will ring with a distinctive pattern, indicating an incoming wireless call. One then picks up the handset and begins talking. One may place a wireless call on hold in order to answer another, incoming call if the cellular service offers call-waiting. A distinct tone announces an incoming call on the phone that is already in a call. One simply presses the "flash" key once to put the current call on hold and accept the second call, in the conventional manner. When the second call is completed, one is returned to the first call, or one may toggle between the two calls using the "flash" key, again in conventional fashion. The redial-function is also provided by simply pressing the "#" key once after hearing the dial tone.

The Bluetooth-wireless connectivity between the cellular mobile handset and the Bluetooth-wireless docking station 16 allows the same docking station to accommodate any type of cellular mobile handset, such as those based on TDMA, GSM, CDMA, or AMPS specifications. This adaptability allows the user to choose which handset he would like to use at any given time or day in order to take advantage of lower-priced call-minutes. In addition, when one switches his cellular service to a different carrier based on a different specification, he need not buy another, different docking station 16 to accommodate it.

It is also to be understood that other wireless-connectivity-protocol and systems may be employed beside Bluetooth-wireless connectivity.

While a specific embodiment of the invention has been shown and described, it is to be understood that numerous changes and modifications may be made therein without departing from the scope and spirit of the invention as set forth in the appended claims.

What is claimed is:

1. In an apparatus for coupling at least one telephone device to a radio network, which apparatus comprises coupling means for coupling the at least one telephone device to a transceiver of a radio mobile handset connected to the radio network, said coupling means comprising interface means providing at least some central-office functions to the at least one telephone device, the improvement comprising:

said coupling means comprising wireless-connectivity transceiver means for communicating with a remote wireless-connectivity-enabled transceiver of a mobile handset connected to a radio network;

said wireless-connectivity transceiver means being operatively connected to said interface means, and comprising means for generating signals for coupling said interface means to said wireless-connectivity-enabled transceiver of a radio mobile handset connected to a radio network, so that the at least one telephone device may be coupled to the radio network via a remote mobile handset, whereby the mobile handset is allowed mobility of movement relative to said apparatus;

said coupling means comprising disconnecting means for disconnecting the pairing of said wireless-connectivity transceiver means with the remote wireless-connectivity-enabled transceiver of a mobile handset when the mobile handset has been removed and is distant from said docking means and is engaged in a call via the radio network.

2. The apparatus for coupling at least one telephone device to a radio network according to claim 1, in combination with a remote wireless-connectivity-enabled mobile handset connected a radio network; said mobile handset comprising a wireless-connectivity-enabled transceiver.

3. The apparatus for coupling at least one telephone device to a radio network according to claim 2, wherein each of said wireless-connectivity transceiver means and said wireless-connectivity-enabled transceiver comprises Bluetooth-wireless-connectivity coupling means.

4. The apparatus for coupling at least one telephone device to a radio network according to claim 3, wherein said wireless-connectivity transceiver means for communicating with a remote wireless-connectivity-enabled transceiver of a mobile handset connected a radio network comprises a wireless-connectivity transceiver capable of being paired with any of a Bluetooth-wireless-connectivity TDMA-based, GSM-based, CDMA-based, and AMPS-based standard transceiver.

5. The apparatus for coupling at least one telephone device to a radio network according to claim 1, wherein said wireless-connectivity transceiver means comprises a Bluetooth-wireless connectivity transceiver means.

6. The apparatus for coupling at least one telephone device to a radio network according to claim 1, wherein said coupling means comprises docking means for receiving a mobile handset therein, and charging means for recharging the battery of the mobile handset.

7. The apparatus for coupling at least one telephone device to a radio network according to claim 1, wherein said coupling means comprises:

a microprocessor;

memory means for said microprocessor;

software means stored in said memory means for controlling said microprocessor;

said microprocessor controlling said wireless-connectivity transceiver means, said interface means for coupling the at least one telephone device to the mobile handset for bidirectional communication therebetween for connecting the at least one telephone telephone device to a radio network for at least one of receiving an incoming call and for making an outgoing call via the radio network, and said disconnecting means for disconnecting the pairing of said wireless-connectivity transceiver means with the remote wireless-connectivity-enabled transceiver of a mobile handset.

8. The apparatus for coupling at least one telephone device to a radio network according to claim 7, wherein said coupling means comprises means for restoring the pairing of said wireless-connectivity transceiver means with the remote wireless-connectivity-enabled transceiver of a mobile handset after the mobile handset has terminated the call;

said microprocessor also controlling said means for restoring the pairing after the mobile handset has terminated the call.

9. The apparatus for coupling at least one telephone device to a radio network according to claim 1, wherein said wireless-connectivity transceiver means for communicating with a remote wireless-connectivity-enabled transceiver of a mobile handset connected to a radio network comprises a wireless-connectivity transceiver capable of being paired with any of a wireless-connectivity-enabled TDMA-based, GSM-based, CDMA-based and AMPS-based standard transceiver.

10. The apparatus for coupling at least one telephone device to a radio network according to claim 1, wherein said coupling means comprises means of said wireless-connectivity transceiver means with the remote wireless-connectivity-enabled transceiver of a mobile handset after the mobile handset has terminated the call.

11. The apparatus for coupling at least one telephone device to a radio network according to claim 1, wherein said coupling means comprises means for connection to the in-premises wiring to which is connected at least one telephone device.

12. A method of coupling an apparatus comprising an interface for use with at least one telephone device for connecting the at least one telephone device to a radio network via a mobile handset having a wireless-enabled transceiver, comprising:

(a) remotely, wirelessly connecting said interface to the wireless-enabled transceiver of said mobile handset, said step of remotely, wirelessly connecting said interface providing mobility to the mobile handset with respect to the apparatus;

(b) said step (a) comprising pairing a wireless transceiver of said apparatus to said wireless-enabled transceiver of said mobile handset;

(c) connecting at least one of an outgoing call made by said mobile handset to the radio network, and an incoming call from the radio network to said mobile handset;

(d) disabling the connection of said step (b) between said wireless transceiver of said apparatus and said wireless-enabled transceiver of said mobile handset while said step (c) is in process; and (e) repeating said step (b) after said step of connecting of said step (c) has ended.

13. The method according to claim 12, wherein said step (a) comprises:

(f) generating messaging between said interface and said mobile handset representative of telephone signals for establishing call-connection between the telephone set and the mobile handset;

(g) connecting the telephone set with the radio network via said mobile handset; and (h) establishing at least one of an incoming call and an outgoing call on the telephone via the radio network with which said mobile handset communicates.

14. The method according to claim 12, wherein said step (b) comprises:

(c) connecting said wireless transceiver of said apparatus to a said wireless-enabled transceiver of one of a TDMA-based, GSM-based, CDMA-based, and AMPS-based standard transceiver of a said mobile handset; and further comprising:

(d) connecting said wireless transceiver of said apparatus to a said wireless-enabled transceiver of another, different one of a TDMA-based, GSM-based, CDMA-based, and AMPS-based standard transceiver of another said mobile handset.

15. A system for coupling at least one telephone device to a radio network, comprising:

interface means coupled to at least one telephone device for providing at least some central office functions thereto;

a radio mobile handset connected to a radio network for communication therewith, and having a wireless-enabled transceiver;

coupling means between said interface means and said radio mobile handset for providing bidirectional communication therebetween;

said coupling means comprising wireless-connectivity transceiver means for communicating with said wireless-enabled transceiver of said radio mobile handset, and comprising means for generating signals for coupling said interface means to said wireless-enabled transceiver of said radio mobile handset, so that the at least one telephone device is coupled to the radio network via said radio mobile handset, whereby the mobile handset is allowed mobility of movement;

said coupling means comprising disconnecting means for disconnecting the pairing of said wireless-connectivity transceiver means with the remote wireless-connectivity-enabled transceiver of a mobile handset when the mobile handset is engaged in a call over the radio network.

16. The system according to claim 15, wherein said wireless-connectivity transceiver means comprises a Bluetooth-wireless connectivity transceiver means, and said wireless-enabled transceiver of said radio mobile handset comprises Bluetooth-wireless-connectivity coupling means.

17. The system according to claim 15, further comprising docking means for receiving said mobile handset therein, said docking means comprising charging means for recharging the battery of said mobile handset.

18. The system according to claim 15, wherein said coupling means comprises:

a microprocessor;

memory means for said microprocessor;

software means stored in said memory means for controlling said microprocessor;

said microprocessor controlling said wireless-connectivity transceiver means, said interface means for coupling the at least one telephone device to the mobile handset for bidirectional communication therebetween for connecting the at least one telephone device to a radio network for at least one of receiving an incoming call and for making an outgoing call via the radio network, and said disconnecting means for disconnecting the pairing of said wireless-connectivity transceiver means with the remote wireless-connectivity-enabled transceiver of a mobile handset;

said wireless-connectivity transceiver means for communicating with a remote wirelessly-enabled transceiver of a mobile handset connected a radio network comprising a wireless-connectivity transceiver capable of being paired with any of a wireless-enabled TDMA-based, GSM-based, CDMA-based, and AMPS-based standard transceiver.

* * * * *

UNITED STATES PATENT AND TRADEMARK OFFICE
CERTIFICATE OF CORRECTION

PATENT NO. : 7,024,189 B2  Page 1 of 1
APPLICATION NO. : 10/823881
DATED : April 4, 2006
INVENTOR(S) : Wonak et al.

It is certified that error appears in the above-identified patent and that said Letters Patent is hereby corrected as shown below:

Column 4:
Line 6, "conventional a" should read -- a conventional --.

Column 9:
Line 2, "docking" should read -- coupling --.

Column 10:
Line 6, before "of", insert -- for restoring the pairing --.

Column 11:
Lines 18-19, "the remote wireless-connectivity-enabled" should read -- said wireless-enabled --;
Line 19, "a" should read -- said --.

Column 12:
Line 11, "to the" should read -- to said --;
Line 18, "the remote wireless-connectivity-enabled" should read -- said wireless-enabled --;
Line 19, "a" should read -- said --;
Line 21, "a remote wirelessly-enabled" should read -- said wireless-enabled --;
Line 22, "of a" should read -- of said --.

Signed and Sealed this

Seventeenth Day of June, 2008

JON W. DUDAS
*Director of the United States Patent and Trademark Office*